2,824,130
PRODUCTION OF ALPHA HYDROXYISOBUTYRIC ACID

Nat C. Robertson, Wellesley, and Thomas R. Steadman, Waban, Mass., assignors, by mesne assignments, to Escambia Chemical Corporation, Pace, Fla., a corporation of Delaware No Drawing. Application April 23, 1956
Serial No. 579,712

5 Claims. (Cl. 260—531)

This invention relates to the production of valuable chemicals and in particular to the production of alpha hydroxy carboxylic acids and esters thereof.

A principal object of the present invention is to provide an economical, integrated process for making methacrylic acid and esters thereof from isobutylene glycol.

Another object of the invention is to provide an improved process for the production of the valuable intermediate compound alpha hydroxyisobutyric acid.

Still another object of the invention is to provide an improved process for oxidizing isobutylene glycol to alpha hydroxyisobutyric acid.

Other objects of the invention will in part be obvious and will in part appear hereinafter.

The invention accordingly comprises the process involving the several steps and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

Methacrylic acid and its esters, such as the ethyl and methyl methacrylates, are very valuable chemicals which have found wide utility in the plastics industry. The production of these chemicals has in the past involved relatively complex procedures and has required the use of relatively expensive starting materials.

The present invention is particularly directed to the conversion of isobutylene glycol to methacrylic acid or esters thereof. A particular aspect of the present invention is directed to the selective oxidation of isobutylene glycol so that only the primary hydroxyl group thereof is converted to the carboxyl group. In one preferred embodiment of the invention, the isobutylene glycol is oxidized by means of potassium hydroxide to alpha hydroxyisobutyric acid which is subsequently converted to methacrylic acid or suitable esters thereof.

The reaction between isobutylene glycol and potassium hydroxide preferably takes place with at least a stoichiometric amount of potassium hydroxide necessary to selectively oxidize the primary hydroxyl group of the isobutylene glycol. This reaction is preferably carried out in a closed system at a temperature between about 200° C. and 300° C. The oxidation preferably takes place in the presence of water and a small amount of a suitable catalyst.

Specific detailed methods of practicing the present invention are set forth in the following nonlimiting examples which are directed more specifically to the step of oxidizing the isobutylene glycol to alpha hydroxyisobutyric acid.

Example I 120 mls. of water, 3.0 grams of cadmium oxide catalyst, 18 grams of isobutylene glycol and 25 grams of potassium hydroxide (86 percent KOH) were charged to a 500 ml. autoclave. The autoclave was sealed, flushed with hydrogen and heated for 3 hours at temperatures on the order of 225° C. to 265° C. The autoclave, when cooled, contained practically pure hydrogen at 240 p. s. i. Analysis of the liquid reaction mixture in the autoclave indicated the presence of 2.3 percent of unreacted isobutylene glycol starting material. The alkaline reaction mixture was made acidic and extracted with diethyl ether. There was recovered from the ether extract an amount of alpha hydroxyisobutyric acid corresponding to a 25.2 percent conversion of the glycol.

This reaction proceeded as follows:

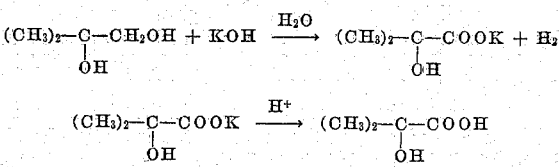

The formation of the alpha hydroxyisobutyric acid is not expected, since certain alkaline oxidation conditions are known to result in the oxidative cleavage of compounds containing a secondary or tertiary hydroxy group.

Example II

Isobutylene glycol was oxidized under conditions similar to those described in Example I except for the fact that no catalyst was employed. In this run, there was recovered an amount of alpha hydroxyisobutyric acid corresponding to a 10.2 percent conversion of the isobutylene glycol.

The oxidation of isobutylene glycol will take place in the presence of water when there is present at least the stoichiometric amount of potassium hydroxide required for the reaction. Better results have been obtained when the potassium hydroxide is present in excess, and particularly at least 5 percent in excess, over the stoichiometric amount needed to selectively oxidize the primary alcohol group. Aqueous potassium hydroxide solutions with a concentration of above 10 percent by weight have been found to be preferable. In addition to potassium hydroxide, other alkali metal hydroxides or mixtures thereof may also be employed.

The reaction is preferably carried out in a closed system at a temperature in the range of from 200° C. to 300° C., although somewhat higher temperatures may be used. The time of reaction may be varied so that, for example, very much shorter periods than those given in the examples are satisfactory. The reaction is carried out in a closed system and the pressure, due primarily to evolved hydrogen, is permitted to build up. Thus the reaction takes place essentially under conditions of increased autogenous pressures, i. e., pressures above atmospheric.

The oxidation is preferably carried out in the presence of a catalyst so as to assure a smooth reaction and increased conversions. In addition to cadmium oxide, zinc oxide may also be employed. The cadmium or zinc oxide may be added as such to the reaction, or the desired oxide may be formed therein by employing a zinc or cadmium compound (e. g., zinc acetate) which is readily reducible to the oxide in an alkaline medium. The terms "cadmium oxide" and "zince oxide" as used herein are meant to embody both concepts. The quantity or amount of the preferred catalysts employed in the reaction can be varied considerably.

The alpha hydroxy carboxylic acid obtained may be subsequently esterfied or dehydrated or subjected to both an esterification and a dehydration. If esters of the alpha hydroxy carboxylic acid are desired, then the alpha hydroxy carboxylic acid can be simple esterified with a suitable alcohol such as the aliphatic alcohols, methanol, ethanol, propanol, the butanols and the like. Such esters may be produced by the general procedures described by Clinton and Laskowski, Journal of the American Chemical Society, 70, 3135 (1948) and in U. S. Patents 1,775,636, 2,336,317 and 2,348,710. If an unsaturated acid is the desired end product, then the alpha hydroxy carboxylic acid can be simply dehydrated. For example, alpha hydroxyisobutyric acid may be dehydrated to methacrylic acid. Likewise, if an ester of the unsaturated acid is desired, then the alpha hydroxy carboxylic acid may be esterfied with a suitable alcohol and the ester dehydrated. For example, alpha hydroxyisobutyric acid may be esterified with methanol and then dehydrated so as to produce methyl methacrylate. The dehydration may be accomplished by means of phosphorus pentoxide or by any of the procedures shown in British Patent 409,733 or in U. S. Patents 1,993,089, 2,054,242, 2,100,993, 2,184,934, 2,226,645, 2,244,389 and 2,356,247.

Since certain changes may be made in the above process without departing from the scope of the invention herein involved, it is intended that all matter contained in the above description shall be interpreted as illustrative and not in a limiting sense.

What is claimed is:

1. A process for the production of alpha hydroxyisobutyric acid which comprises oxidizing in a closed system isobutylene glycol with an aqueous alkali metal hydroxide solution having an alkali metal hydroxide concentration in excess of 10 percent at a temperature between about 200° C. and 300° C., said alkali metal hydroxide being used in at least the stoichiometric amount required to selectively oxidize the primary hydroxyl group.

2. A process for the production of alpha hydroxyisobutyric acid which comprises oxidizing in a closed system isobutylene glycol with an aqueous alkali metal hydroxide solution having an alkali metal hydroxide concentration in excess of 10 percent, said reaction being carried out in the presence of an oxidation catalyst and at a temperature between about 200° C. and 300° C., said alkali metal hydroxide being used in at least the stoichiometric amount required to selectively oxidize the primary hydroxyl group, acidifying the resultant reaction mixture, and isolating alpha hydroxyisobutyric acid.

3. The process of claim 2 wherein said alkali metal hydroxide is potassium hydroxide and said oxidation catalyst is cadmium oxide.

4. The process of claim 2 wherein said alkali metal hydroxide is potassium hydroxide and said oxidation catalyst is zinc oxide.

5. A process for the production of alpha hydroxyisobutyric acid which comprises oxidizing isobutylene glycol with an aqueous alkali metal hydroxide solution having an alkali metal hydroxide concentration in excess of 10 percent at a pressure above atmospheric and at a temperature between about 200° C. and 300° C., said alkali metal hydroxide being used in at least the stoichiometric amount required to selectively oxidize the primary hydroxyl group.

References Cited in the file of this patent

UNITED STATES PATENTS

| | | |
|---|---|---|
| 1,926,068 | Strosacker et al. | Sept. 12, 1933 |
| 2,384,817 | Chitwood | Sept. 18, 1945 |